US011163613B2

(12) United States Patent
Matyasik et al.

(10) Patent No.: US 11,163,613 B2
(45) Date of Patent: Nov. 2, 2021

(54) AUTOMATED SYSTEM INTEGRATION

(71) Applicant: International Business Machines Corporation, Armonk, CA (US)

(72) Inventors: Lukasz Jozef Matyasik, Alwernia (PL); Lukasz Tomasz Jeda, Alwernia (PL); Tomasz Andrzej Stopa, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 16/520,348

(22) Filed: Jul. 23, 2019

(65) Prior Publication Data

US 2021/0026705 A1 Jan. 28, 2021

(51) Int. Cl.
 *G06F 9/50* (2006.01)
 *G06F 9/54* (2006.01)
(52) U.S. Cl.
 CPC .......... *G06F 9/5083* (2013.01); *G06F 9/5027* (2013.01); *G06F 9/547* (2013.01)
(58) Field of Classification Search
 CPC ...... G06F 9/5083; G06F 9/5027; G06F 9/547; G06F 9/54; G06F 9/5061; G06F 2209/541
 See application file for complete search history.

(56) References Cited

U.S. PATENT DOCUMENTS

| 8,620,999 | B1 * | 12/2013 | L'Heureux | ......... | H04L 67/1002 709/203 |
| 2013/0275509 | A1 | 10/2013 | Micucci et al. | | |
| 2016/0028808 | A1 | 1/2016 | Arthursson et al. | | |
| 2016/0182628 | A1 | 6/2016 | Chen et al. | | |
| 2017/0153883 | A1 | 6/2017 | Oliver et al. | | |
| 2018/0260251 | A1 * | 9/2018 | Beveridge | ........... | G06F 9/45558 |
| 2019/0132378 | A1 * | 5/2019 | Perl | ....................... | G06F 16/9566 |
| 2021/0026904 | A1 * | 1/2021 | Ly | ........................ | G06F 16/951 |

OTHER PUBLICATIONS

IBM, "Maintain Software Audit Readiness and Mitigatesecurity Risks with Software Compliance and Usage" dated 2017, IBM BigFix Inventory, Total 6 pages.

* cited by examiner

*Primary Examiner* — Sisley N Kim
(74) *Attorney, Agent, or Firm* — Konrad, Raynes, Davda and Victor LLP; David W. Victor (57) ABSTRACT

Provided are a computer program product, network computing system, and method for automated system integration. A first system gathers a request list of requested computational resources to transmit to the second system, receives a list of accessible computational resources available through the second system, and determines matching computational resources in the request list that match computational resources in the list of accessible computational resources. The first system sends information on the matching computational resources to the second system. The second system gathers the matching computational resources received from the first system to make accessible to the first system at a resource location accessible over a network and sends access information for the matching computational resources gathered by the second system. The first system uses the access information to access the matching computational resources at the resource location over the network to deploy the matching computational resources at the first system.

20 Claims, 4 Drawing Sheets

AUTOMATED SYSTEM INTEGRATION

BACKGROUND OF THE INVENTION

1. Field of the Invention

The present invention relates to a computer program product, network computing system, and method for automated system integration.

2. Description of the Related Art

System integration involves maintaining one or more client or consumer systems synchronized with programs and data in a central system maintaining the computational resources and program. In this way, a provider system maintains the program and data and other systems import data and programs and functionality from the provider system to deliver functionality to end users. System integration requires that the systems include protocols to communicate and share information.

There is a need in the art to provide improved techniques for integrating systems.

SUMMARY

Provided are a computer program product, network system, and method for automated system integration. A first system gathers a request list of requested computational resources to transmit to the second system. The first system receives a list of accessible computational resources available through the second system and determines matching computational resources in the request list that match computational resources in the list of accessible computational resources. The first system sends information on the matching computational resources to the second system. The second system gathers the matching computational resources received from the first system to make accessible to the first system at a resource location accessible over a network and sends access information for the matching computational resources gathered by the second system. The first system uses the access information to access the matching computational resources at the resource location over the network to deploy the matching computational resources at the first system.

DETAILED DESCRIPTION

System integration challenges include making sure the consumer or client systems are upgraded with needed resources and synchronizing the consumer systems when resources at the provider system are upgraded. Described embodiments provide improvement to system integration by allowing automated determination of computational resources at the resource provider system that satisfy computational resource needs at the consumer systems and for making computational resources at the provider system matching the resources needed by the consumer systems available to the consumers systems. Further described embodiments provide improved techniques for making updates to computational resources automatically available to the consumer systems. Described embodiments provide improved techniques for automating the system integration process.

Figure 1:
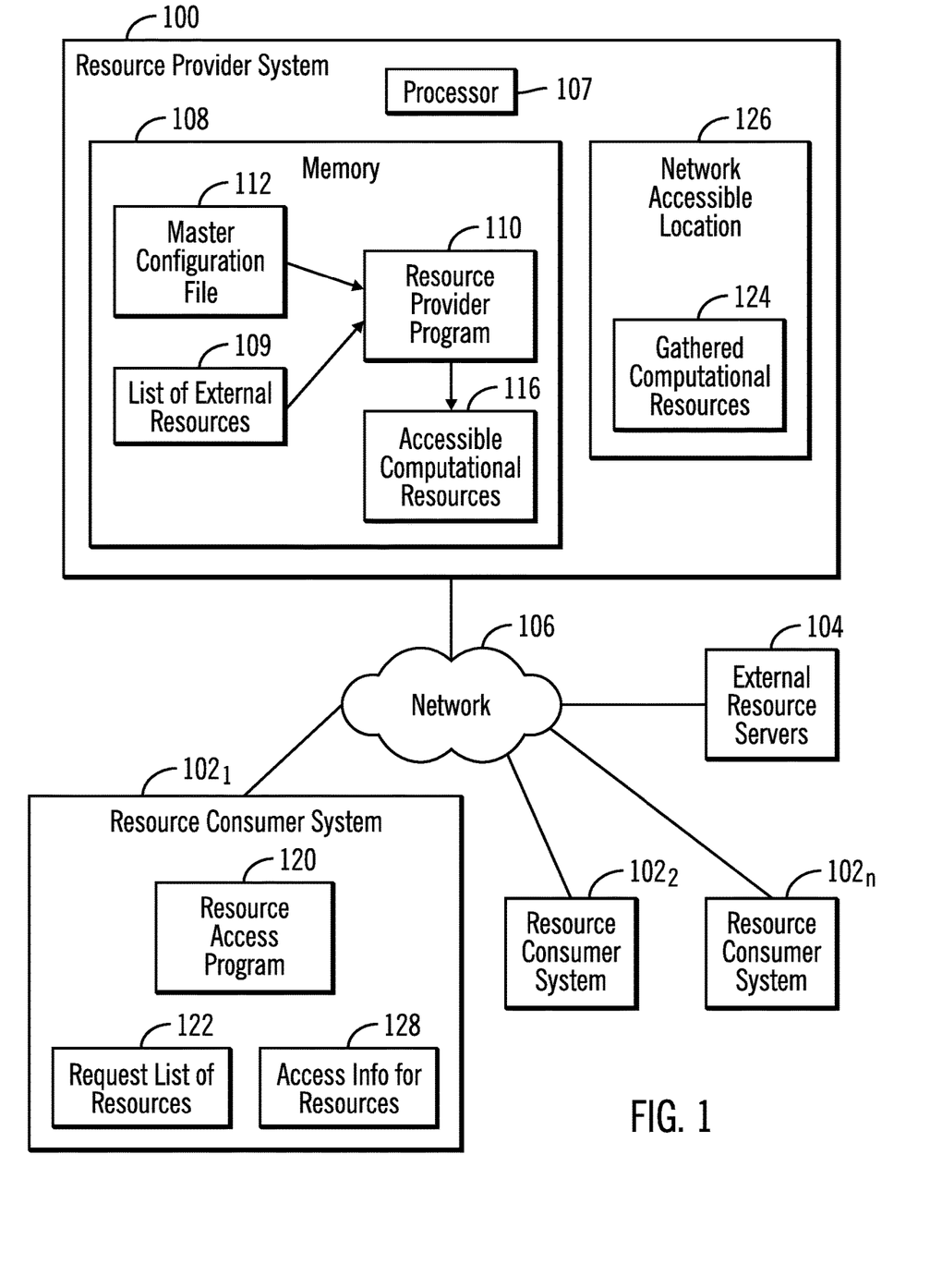
FIG. 1 illustrates an embodiment of a system integration computing environment.

FIG. 1 illustrates an embodiment of a system integration computing environment having a resource provider system 100 that communicates with resource consumer systems $102_1, 102_2 \ldots 102_n$ and external resource servers 104 over a network 106. The resource provider system 100 has a processor 107 comprising one or more processor cores that execute programs loaded in a memory 108, including a resource provider program 110 that makes computational resources indicated in a master configuration file 112 and a list of external resources 109 accessible to the resource consumer systems $102_1, 102_2 \ldots 102_n$. As one example, the resource provider system 100 may provide certain data and a resource consumer system 102 may import the data from the resource provider system 100, using the data to deliver some functionality to an end user.

The master configuration file 112 provides a list of computational resources the resource provider system 100 is capable of providing and exposing to the resource consumer systems $102_1, 102_2 \ldots 102_n$, such as databases, attributes, configuration settings, APIs, application programs, etc. Computational resources may include processing resources, data, or both. The master configuration file 112 may include API arguments and settings, computational resource configurations, files to provide, authentication and authorization information, controller configuration parameters to select and access controllers and devices, etc. The list of external resources 109 includes computational resources the resource provider system 100 may access from external resource servers 104, which may comprise application servers, database servers, etc.

The resource provider program 110 may combine the available computational resources indicated in the master configuration file 112 and indicated in the list of external resources 109 to access from the external resource servers 104 into a list of accessible computational resources 116 to provide to the consumer systems $102_1, 102_2 \ldots 102_n$.

The consumer systems $102i$, as shown with respect to consumer system $102_1$, may include a resource access program 120 to communicate with the resource provider program 110 to integrate computational resources locally at the resource consumer system $102_i$. The resource access program 120 may create a request list of resources 122 indicating computational resources the resource consumer system $102_1$ wants to access, which may be in a human language form, based on local and user processing needs. The resource access program 120 determines resources in the request list 122 to request from the resource provider system 100. The resource provider program 110 gathers requested resources from the resources access program 120 to make available as gathered computational resources 124 in a network accessible location 126, such as a network storage, web server, etc. The resource provider program 110 provides the consumer system $102_i$ access information 128 for the gathered computational resources to allow the resource access program 120 to access from the network accessible location 126.

There can be a technical problem of keeping the resource provider system 100 compatible with the resource consumer system 102 when various components are changed to different versions. According to various embodiments, integrated systems self-adjust to communicate with each other when one of the systems changes. The adjustment may take place without human involvement or a need to modify other systems. This may include automated processes for the resource consumer system 102 to inform the resource provider system 100 of a new or modified data need, for updating the resource provider system 100 to collect the needed data, and for adapting the data exchange between the systems.

The network 106 may comprise a network such as a Storage Area Network (SAN), Local Area Network (LAN), Intranet, the Internet, Wide Area Network (WAN), peer-to-peer network, wireless network, arbitrated loop network, etc.

The memory 108 may comprise a suitable volatile or non-volatile memory for storing programs to execute and information used by the program 110 to execute.

The programs 110, 120 may comprise program code loaded into memory and executed by a processor. Alternatively, some or all of the functions may be implemented in hardware devices, such as in Application Specific Integrated Circuits (ASICs) or executed by separate dedicated processors.

Although a certain number of instances of elements, such as resource provider system 100, resource consumer systems $102_i$, and external resource servers 104, etc., are shown, there may be any number of these elements.

In FIG. 1, arrows are shown between components in the memory 108. These arrows represent information flow to and from the resource provider program 110 and do not represent structures in the memory 108.

Figure 2:
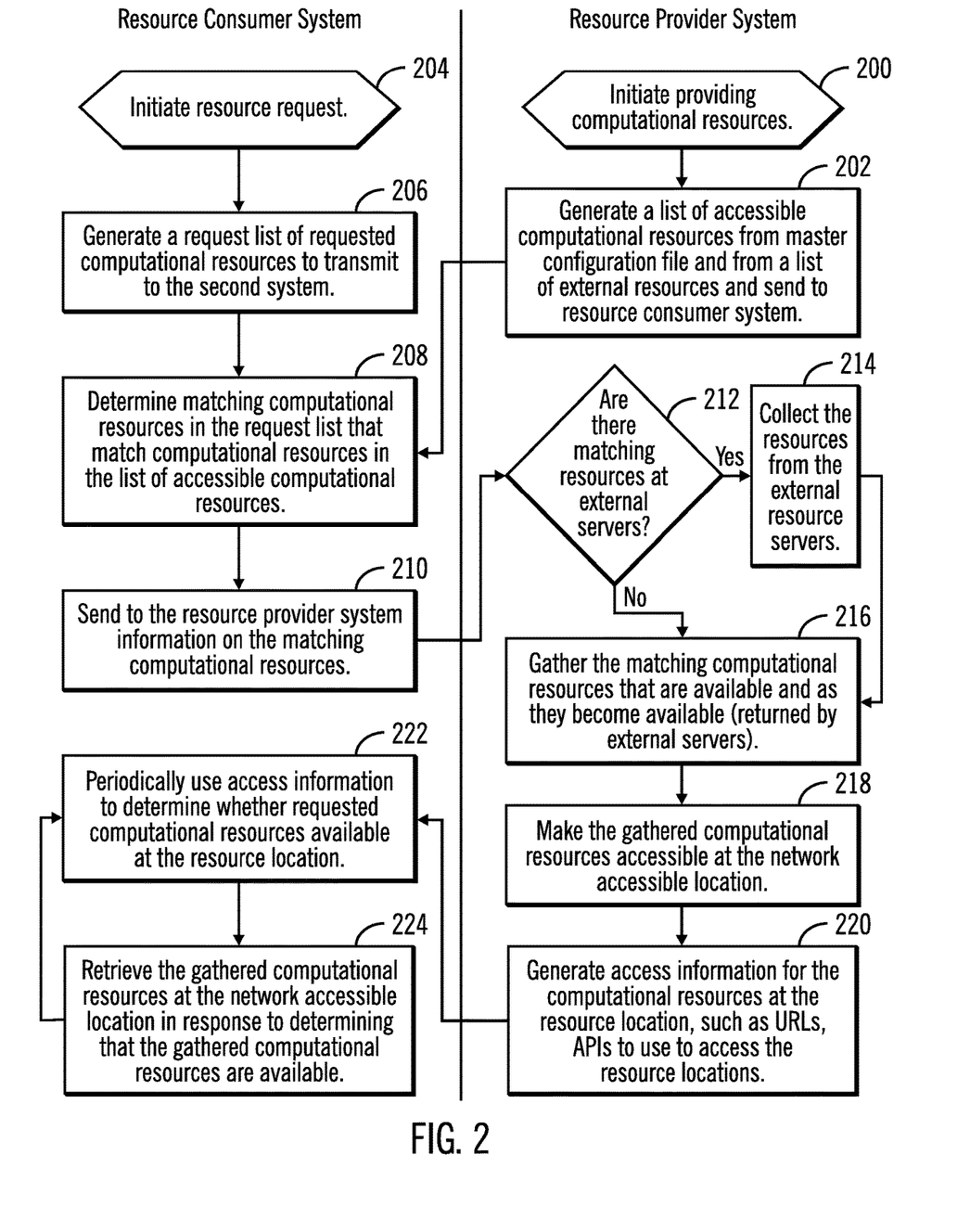
FIG. 2 illustrates an embodiment of operations to perform system integration between a resource provider system and resource consumer systems.

FIG. 2 illustrates an embodiment of operations performed by the resource provider program 110 and resource access program 120 to exchange data and computational resources to the resource consumer system $102_i$ to deploy for users. The resource provider program 110 and resource access program 120 may use tokens to provide security and authentication for communications therebetween. A resource consumer systems 102 may only be integrated with an approved resource provider program 110 and securing communications using tokens may help ensure that a resource consumer systems 102 is not integrated with an unapproved resource provider program 110. Failure to use secure communications could have adverse effects when integrated systems self-adjust as a result of a systems change. Upon initiating (at block 200) providing computational resources, the resource provider program 110 generates (at block 202) a list of accessible computational resources 116 from those deployable computational resources indicated in the master configuration file 112 and the list of external resources 109, which may not yet have been collected from the external resource servers 104. The generated list of accessible computational resources 116 are sent to the resource consumer system $102_i$.

The resource access program 120 initiates (at block 204) a resource request process, which may be initiated by a user request or other operation, such as receiving the list of accessible computational resources 116 from the resource provider system 100, which may comprise an initial list or updated list of accessible computational resources 116. A request list 122 of computational resources is generated (at block 206) at the resource consumer system $102_i$, which may comprise desired computational resources in a human language form or may comprise desired attributes. The request list 122 may be in a human readable form if created by a person describing the desired computational resources to integrate at the resource consumer system $102_i$.

In certain embodiments, the resource access program 120 may initiate the resource request at block 204 to generate the request list 122 based on computational needs at the consumer system $102_i$ to provide desired functionality to end users. The resource access program 120 may request the accessible computational resources 116 to initiate the operation at block 200. Alternatively, the operation at block 200 may be performed independently of a request from the resource consumer system $102_i$ to update resource consumer systems with accessible computational resources 116.

Upon receiving the list of accessible computational resources 116, the resource access program 120 determines (at block 208) matching computational resources in the request list 122 that match computational resources in the list of accessible computational resources 116 and sends (at block 210) information on the matching computational resources to the resource provider system 100. If the request list 122 comprises human language descriptions, then the resource access program 120 may include a natural language processor (NLP) module to generate technical descriptions from the human language description of computational needs at the resource consumer system $102_i$ to compare with the list of accessible computational resources 116 provided by the resource provider system 100. The NLP module may be based on machine learning algorithms to automatically learn rules to interpret language statements by analyzing a set of examples (i.e. a large corpus, like a book, down to a collection of sentences), and making a statistical inference. The NLP may process the human language statements into descriptions of computational resources used in the master configuration file 112 and list of external resources 109. Alternatively, the NLP may compare the human descriptions with the accessible computational resources 116 to determine whether any of the listed accessible computational resources 116 match the human language descriptions in the request list of resources 122.

For instance, a user of the resource consumer system $102_i$ may issue a query in human readable form, such as "What is the BIOS Serial Number of each machine running in my environment". Although the resource consumer system $102_i$ itself does not have the capability to connect to each of the endpoints in the infrastructure and obtain that information, the query may be provided in the request list 122 and presented to the resource provider system 100 to gather information from the infrastructure in the list of accessible computational resources 116 and find that information on the Universally Unique Identifier (UUID) of each endpoint in the infrastructure to match the request in the request list 122, which may be in human readable form. For instance, the resource consumer system $102_i$ may perform NLP preprocessing of the query (such as extract the relevant information that the resource called UUID needs to be obtained from all the endpoints in the infrastructure), and includes the raw or preprocessed query on the list of computational resources 122 to send to the resource provider system 100 to gather the requested information and make available to the requesting resource consumer system $102_i$.

Upon receiving the information on the matching computational resources, the resource provider system 100 determines (at block 212) whether there are any requested matching computational resources at external resource servers 114. If so, then the resource provider program 110 collects (at block 214) the requested resources from the external resource servers 114. The resource provider program 110 gathers (at block 216) the matching computational resources that are available in the resource provider system 100 or that are collected from the external resource servers 114 and makes the gathered computational resources 124 accessible at the network accessible location 126. If not all the gathered computational resources 124 are immediately available, they may be added to the network accessible location 126 when collected from the external resource servers 114. The resource provider program 110 generates (at block 220) access information 128 for the resources having information on how the resource consumer system $102_i$ may access the gathered computational resources 124 at the network accessible location 126, such as universal resource locator (URL) links, application program interfaces (APIs), etc., and returns that access information 128 to the resource consumer system $102_i$ Upon receiving (at block 222) the access information 128, the resource access program 120 periodically uses the access information 128 to determine whether the requested matching computational resources are available at the network accessible location 126, which may be within the resource provider system 100 or external on the network 106. The resource access program 120 retrieves (at block 224) the gathered computational resources 124 at the network accessible location 126, such as using a URL or APIs indicated in the access information 128, in response to determining that the gathered computational resources 124 are available at the network accessible location 126. If certain of the computational resources are not yet available, such as being collected from the external resource servers 114, then control returns to block 222 to continue to check for when the resources become available.

With the embodiment of FIG. 2, the resource provider system 100 and resource consumer system $102_i$ engage in a transfer of information to allow the resource consumer system $102_i$ to access computational resources available through the resource provider system 100 that are specified in a request list of resources 122 generated at the resource consumer system $102_i$. The described embodiments provide for automatic collection and retrieval of computational resources the resource consumer systems $102_i$ need according to their request list of resources 122.

Figure 3:
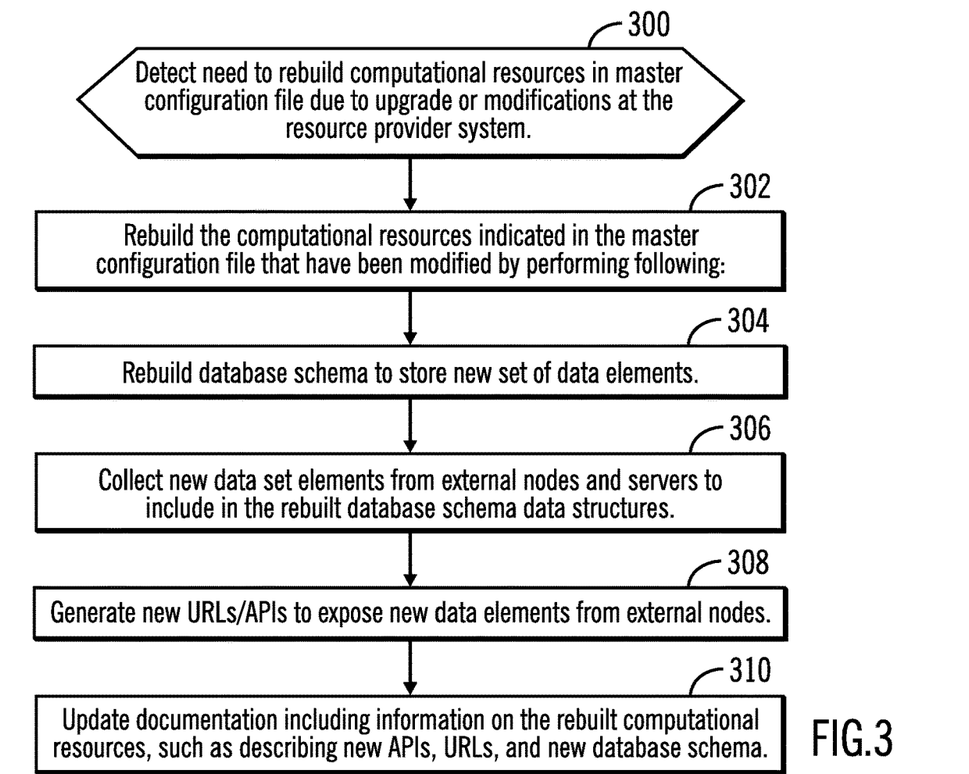
FIG. 3 illustrates an embodiment of operations for the resource provider system to rebuild computational resources to provide to the resource consumer systems.

FIG. 3 illustrates an embodiment of operations performed by the resource provider program 110 to rebuild gathered computational resources 124. The rebuild operation may be performed after the resource provider system 100 is upgraded, which may change the accessible computational resources 116 based on modified or new hardware and/or software capabilities of the resource provider system 100. Upon detecting (at block 300) that gathered computational resources 124 in the master configuration file 112 have been modified, the resource provider program 110 may rebuild (at block 302) the gathered computational resources, such as by performing the operations at blocks 306-310. At block 304, the rebuilding involves rebuilding a database schema to store a new set of data elements when the detected change comprises new data that requires changes to database computational resources. The resource provider program 110 may collect (at block 306) the new data set elements from external nodes and servers 114 to include in the rebuilt database schema data structures. At block 308, the rebuilding involves generating new URLs and APIs to expose the new data elements from external nodes to include in updated access information $128_U$ to return to the resource consumer system $102_i$ to use to access rebuilt computational resources the consumer system $102_i$ requested. At block 310, the rebuilding may include updating documentation including information on the rebuilt computational resources, such as describing new APIs, URLs, and new database schema.

With the embodiment of FIG. 3, the resource provider system 100 updates gathered computational resources based on changes to data and new data elements to automatically make the updated computational resources available to the consumer system that requested those resources. This automates the resource provider system 100 pushing updates to matching computational resources requested by the resource consumer system $102_i$ to the resource consumer system $102_i$ to allow the resource consumer system $102_i$ to automatically access the rebuilt and updated matching computational resources previously requested.

In a further embodiment, the resource provider system 100 may proceed to block 202 in FIG. 2 to generate updated accessible computational resources $116_U$ based on modifications, such as hardware and/or software modifications, additions or upgrades at the resource provider system 100. Sending the updated list of accessible computational resources triggers the resource consumer system $102_i$ at block 208 in FIG. 2 to update the matching computational resources that match computational resources in the updated list of accessible computational resources $116_U$. The resource consumer system $102_i$ may then perform further operations in FIG. 2 to send the updated matching computational resources to the resource provider system 100 to generate an updated access information $128_U$ to allow the resource consumer system $102_i$ to access updated computational resources due to the changes at the resource provider system 100.

Figure 4:
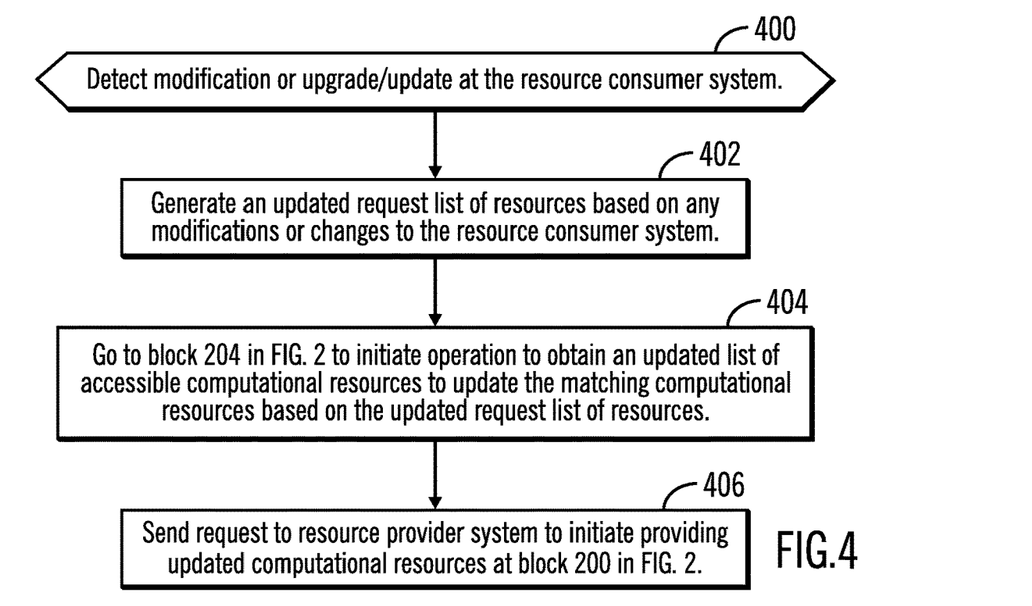
FIG. 4 illustrates an embodiment of operations for a resource consumer system to generate an updated request list of resources upon modifications to the resource consumer system.

FIG. 4 illustrates an embodiment of operations performed by the resource access program 120 upon detecting an update or modification to the resource consumer system $102_i$. Upon detecting (at block 400) a modification or upgrade/update to the resource consumer system $102_i$, including a software and/or hardware modification, upgrade, addition, etc., the resource access program 120 generates (at block 402) an updated request list of resources $122_U$ based on any modifications or changes to the resource consumer system $102_i$. Control then proceeds to block 204 in FIG. 2 where the resource access program 120 initiates an operation to obtain an updated list of accessible computational resources $116_U$ to update the matching computational resources based on the updated request list of resources $122_U$, and to receive updated access information $128_U$ to use to access updated matching computational resources at the network accessible location 126. The resource access program 120 sends (at block 406) a request to the resource provider system 100 to initiate providing updated computational resources at block 200 in FIG. 2.

With the embodiment of FIG. 4, the resource access program system 120 may generate a new updated request list of resources based on modifications or changes at the resource consumer system $102_i$, which necessitates obtaining updated access information $128_U$ for computational resources to access updated gathered computational resources $124_U$ to access from the network accessible location 126 based on the modifications made to the resource consumer system $102_i$ that result in changes to the request list of resources 122.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the resource provider system 100, the resource consumer systems $102_1$, $102_2$ ... $102_n$, and the external resource servers 104, may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

Figure 5:
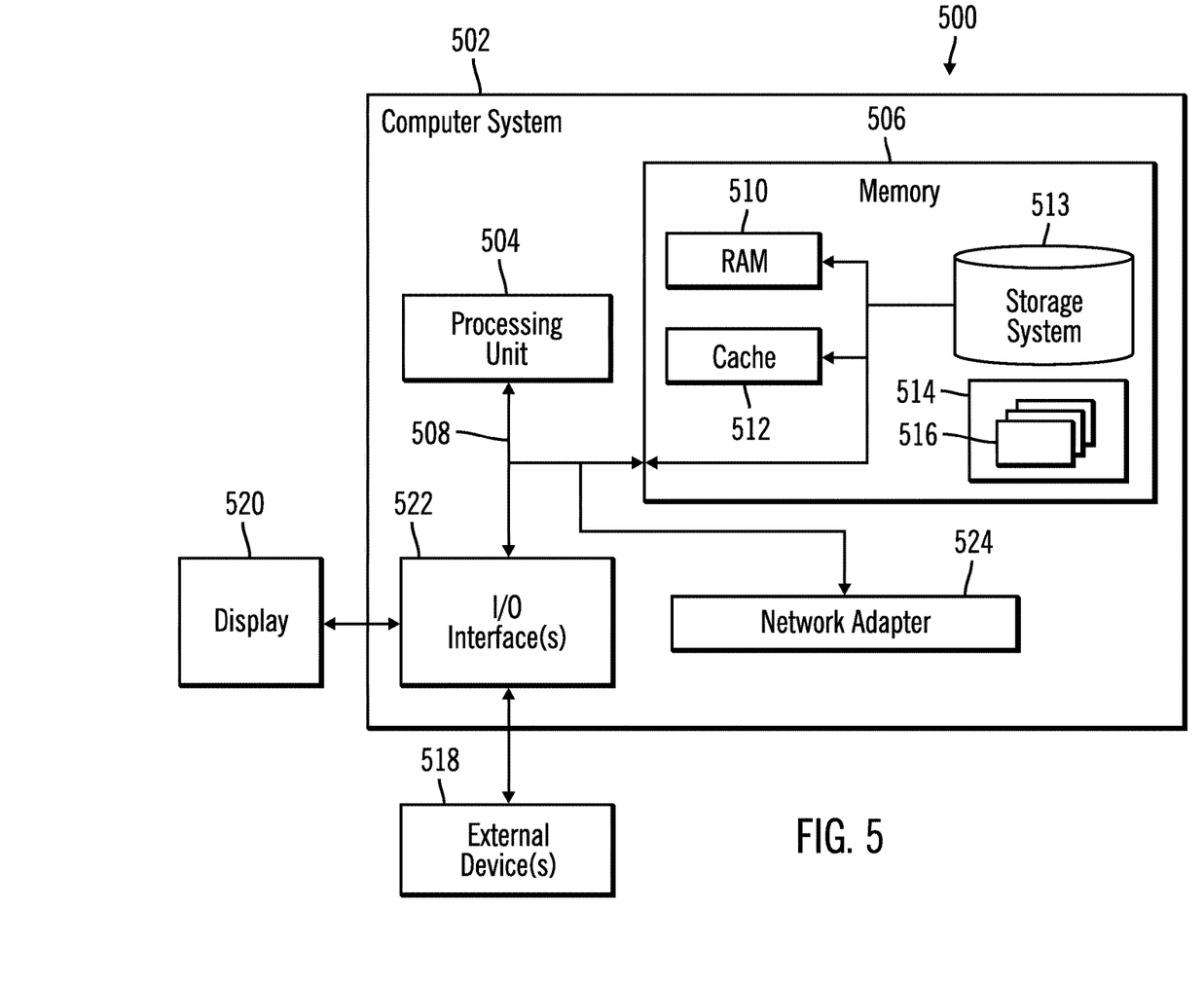
FIG. 5 depicts a computing environment in which the components of FIG. 1 may be implemented.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to, microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for integrating a first system and a second system, wherein the computer program product comprises a computer readable storage medium having computer readable program instructions executed by the first system and the second system to perform operations, the operations comprising:
   generating, by the first system, a request list of requested computational resources to transmit to the second system;
   receiving, by the first system, a list of accessible computational resources available through the second system;
   determining, by the first system, matching computational resources in the request list that match computational resources in the list of accessible computational resources;
   sending, by the first system, information on the matching computational resources to the second system;
   gathering, by the second system, the matching computational resources received from the first system to make accessible to the first system at a resource location accessible over a network;
   sending, by the second system, access information for the matching computational resources gathered by the second system; and
   using, by the first system, the access information to access the matching computational resources at the resource location over the network to deploy the matching computational resources at the first system.

2. The computer program product of claim 1, wherein the request list comprises human language descriptions of the requested computational resources, wherein the determining the matching computational resources uses natural language processing to determine the human language descriptions of the requested computational resources that match the list of accessible computational resources available through the second system.

3. The computer program product of claim 1, wherein the computational resources comprise at least one of application programs and data objects, wherein the operations further comprise:
   storing, by the second system, the gathered matching computational resources at a network accessible location accessible through network addresses, wherein the access information comprises the network addresses to allow the first system to access the gathered matching computational resources using the network addresses.

4. The computer program product of claim 3, wherein the operations further comprise:
   periodically using, by the first system, the network addresses to determine whether the gathered matching computational resources are available at the network addresses; and
   retrieving, by the first system, the gathered matching computational resources at the network addresses in response to determining that the gathered matching computational resources are available at the network addresses.

5. The computer program product of claim 1, wherein the computational resources comprise at least one of application programs and data objects, wherein the operations further comprise:
   storing the gathered matching computational resources at a network accessible location accessible through Application Program Interfaces (APIs), wherein the access information comprises the APIs the first system calls to access the gathered matching computational resources.

6. The computer program product of claim 1, wherein the operations further comprise:
   determining, by the second system, whether any of the gathered matching computational resources made available at the resource location have been modified to modified matching computational resources;
   gathering, by the second system, the modified matching computational resources to make accessible to the first system at an additional resource location accessible over a network;
   sending, by the second system, additional access information for the modified matching computational resources gathered by the second system; and
   using, by the first system, the additional access information to access the modified matching computational resources at the additional resource location over the network to deploy the modified matching computational resources at the first system.

7. The computer program product of claim 1, wherein the operations further comprise:
   maintaining, by the second system a master configuration file listing computational resources the second system is exposing to external systems and a list of external resources not yet accessed by the second system that are accessible through external servers, wherein the list of accessible computational resources comprises the computational resources from the master configuration file and the list of external resources.

8. The computer program product of claim 1, wherein the operations further comprise:
   detecting a modification to a configuration of the second system;
   in response to detecting the modification to the second system, rebuilding, by the second system, the computational resources indicated in the list of accessible computational resources to produce rebuilt computational resources;
   sending, by the second system, additional access information for the rebuilt computational resources; and
   using, by the first system, the additional access information to access the rebuilt computational resources over the network to deploy the rebuilt computational resources at the first system.

9. The computer program product of claim 8, wherein the rebuilding the computational resources comprises at least one of: rebuilding database schema to store new data elements; rebuilding APIs to expose the new data elements; data collection logic to manage devices that gather information; and documentation describing the rebuilt APIs.

10. The computer program product of claim 1, wherein the operations further comprise:
    detecting a modification to a configuration of the second system;
    in response to detecting the modification to the second system, rebuilding, by the second system, an updated list of accessible computational resources to produce rebuilt computational resources;
    sending, by the second system, the updated list of accessible computational resources to the first system;
    determining, by the first system, updated matching computational resources in the request list that match computational resources in the updated list of accessible computational resources;
    sending, by the first system, information on the updated matching computational resources;

gathering, by the second system, the updated matching computational resources received from the first system to make accessible to the first system at a resource location accessible over a network;

sending, by the second system, access information for the updated matching computational resources gathered by the second system; and using, by the first system, the access information to access the updated matching computational resources at the resource location over the network to deploy the updated matching computational resources at the first system.

11. The computer program product of claim 1, wherein the operations further comprise:

detecting a modification to the first system;

in response to detecting the modification, generating, by the first system, an updated request list of resources based on the modifications to the first system;

obtaining, by the first system, an updated list of accessible computational resources from the second system;

determining, by the first system, updated matching computational resources in the updated request list that match computational resources in the updated list of accessible computational resources;

sending, by the first system, information on the updated matching computational resources;

gathering, by the second system, the updated matching computational resources received from the first system to make accessible to the first system at a resource location accessible over a network;

sending, by the second system, updated access information for the updated matching computational resources gathered by the second system; and using, by the first system, the updated access information to access the updated matching computational resources at the resource location over the network to deploy the updated matching computational resources at the first system.

12. A network computing system for integration over a network, comprising:

a first system;

a second system, wherein the first and the second systems communicate over the network;

wherein the first system and the second system have computer readable storage medium having computer readable program instructions executed by the first system and the second system to perform operations, the operations comprising:

generating, by the first system, a request list of requested computational resources to transmit to the second system;

receiving, by the first system, a list of accessible computational resources available through the second system;

determining, by the first system, matching computational resources in the request list that match computational resources in the list of accessible computational resources;

sending, by the first system, information on the matching computational resources to the first system;

gathering, by the second system, the matching computational resources received from the first system to make accessible to the first system at a resource location accessible over a network;

sending, by the second system, access information for the matching computational resources gathered by the second system; and using, by the first system, the access information to access the matching computational resources at the resource location over the network to deploy the matching computational resources at the first system.

13. The network computing system of claim 12, wherein the operations further comprise:

determining, by the second system, whether any of the gathered matching computational resources made available at the resource location have been modified to modified matching computational resources;

gathering, by the second system, the modified matching computational resources to make accessible to the first system at an additional resource location accessible over a network;

sending, by the second system, additional access information for the modified matching computational resources gathered by the second system; and using, by the first system, the additional access information to access the modified matching computational resources at the additional resource location over the network to deploy the modified matching computational resources at the first system.

14. The network computing system of claim 12, wherein the operations further comprise:

detecting a modification to a configuration of the second system;

in response to detecting the modification to the second system, rebuilding, by the second system, the computational resources indicated in the list of accessible computational resources to produce rebuilt computational resources;

sending, by the second system, additional access information for the rebuilt computational resources; and using, by the first system, the additional access information to access the rebuilt computational resources over the network to deploy the rebuilt computational resources at the first system.

15. The network computing system of claim 12, wherein the operations further comprise:

detecting a modification to a configuration of the second system;

in response to detecting the modification to the second system, rebuilding, by the second system, an updated list of accessible computational resources to produce rebuilt computational resources;

sending, by the second system, the updated list of accessible computational resources to the first system;

determining, by the first system, updated matching computational resources in the request list that match computational resources in the updated list of accessible computational resources;

sending, by the first system, information on the updated matching computational resources;

gathering, by the second system, the updated matching computational resources received from the first system to make accessible to the first system at a resource location accessible over a network;

sending, by the second system, access information for the updated matching computational resources gathered by the second system; and using, by the first system, the access information to access the updated matching computational resources at the resource location over the network to deploy the updated matching computational resources at the first system.

16. The network computing system of claim 12, wherein the operations further comprise:

detecting a modification to the first system;
in response to detecting the modification, generating, by the first system, an updated request list of resources based on the modifications to the first system;
obtaining, by the first system, an updated list of accessible computational resources from the second system;
determining, by the first system, updated matching computational resources in the updated request list that match computational resources in the updated list of accessible computational resources;
sending, by the first system, information on the updated matching computational resources;
gathering, by the second system, the updated matching computational resources received from the first system to make accessible to the first system at a resource location accessible over a network;
sending, by the second system, updated access information for the updated matching computational resources gathered by the second system; and
using, by the first system, the updated access information to access the updated matching computational resources at the resource location over the network to deploy the updated matching computational resources at the first system.

17. A method for integrating a first system and a second system, comprising
generating, by the first system, a request list of requested computational resources to transmit to the second system;
receiving, by the first system, a list of accessible computational resources available through the second system;
determining, by the first system, matching computational resources in the request list that match computational resources in the list of accessible computational resources;
sending, by the first system, information on the matching computational resources to the second system;
gathering, by the second system, the matching computational resources received from the first system to make accessible to the first system at a resource location accessible over a network;
sending, by the second system, access information for the matching computational resources gathered by the second system; and
using, by the first system, the access information to access the matching computational resources at the resource location over the network to deploy the matching computational resources at the first system.

18. The method of claim 17, further comprising:
determining, by the second system, whether any of the gathered matching computational resources made available at the resource location have been modified to modified matching computational resources;
gathering, by the second system, the modified matching computational resources to make accessible to the first system at an additional resource location accessible over a network;
sending, by the second system, additional access information for the modified matching computational resources gathered by the second system; and
using, by the first system, the additional access information to access the modified matching computational resources at the additional resource location over the network to deploy the modified matching computational resources at the first system.

19. The method of claim 17, further comprising:
detecting a modification to a configuration of the second system;
in response to detecting the modification to the second system, rebuilding, by the second system, an updated list of accessible computational resources to produce rebuilt computational resources;
sending, by the second system, the updated list of accessible computational resources to the first system;
determining, by the first system, updated matching computational resources in the request list that match computational resources in the updated list of accessible computational resources;
sending, by the first system, information on the updated matching computational resources;
gathering, by the second system, the updated matching computational resources received from the first system to make accessible to the first system at a resource location accessible over a network;
sending, by the second system, access information for the updated matching computational resources gathered by the second system; and
using, by the first system, the access information to access the updated matching computational resources at the resource location over the network to deploy the updated matching computational resources at the first system.

20. The method of claim 17, further comprising:
detecting a modification to the first system;
in response to detecting the modification, generating, by the first system, an updated request list of resources based on the modifications to the first system;
obtaining, by the first system, an updated list of accessible computational resources from the second system;
determining, by the first system, updated matching computational resources in the updated request list that match computational resources in the updated list of accessible computational resources;
sending, by the first system, information on the updated matching computational resources;
gathering, by the second system, the updated matching computational resources received from the first system to make accessible to the first system at a resource location accessible over a network;
sending, by the second system, updated access information for the updated matching computational resources gathered by the second system; and
using, by the first system, the updated access information to access the updated matching computational resources at the resource location over the network to deploy the updated matching computational resources at the first system.

* * * * *